(12) United States Patent
Okawa et al.

(10) Patent No.: US 11,298,962 B2
(45) Date of Patent: Apr. 12, 2022

(54) INK JET RECORDING APPARATUS

(71) Applicant: Hitachi Industrial Equipment Systems Co., Ltd., Tokyo (JP)

(72) Inventors: Keisuke Okawa, Tokyo (JP); Takashi Kawano, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 0 days.

(21) Appl. No.: 16/756,089

(22) PCT Filed: Jun. 26, 2018

(86) PCT No.: PCT/JP2018/024082
§ 371 (c)(1),
(2) Date: Apr. 14, 2020

(87) PCT Pub. No.: WO2019/077805
PCT Pub. Date: Apr. 25, 2019

(65) Prior Publication Data
US 2021/0187984 A1    Jun. 24, 2021

(30) Foreign Application Priority Data
Oct. 19, 2017   (JP) .............................. JP2017-202299

(51) Int. Cl.
*B41J 29/38*     (2006.01)
*B41J 2/01*      (2006.01)
*G06F 9/445*     (2018.01)
(52) U.S. Cl.
CPC ................. *B41J 29/38* (2013.01); *B41J 2/01* (2013.01); *G06F 9/445* (2013.01)

(58) Field of Classification Search
CPC ........................... G06K 15/00; H04N 1/32561
See application file for complete search history.

(56) References Cited

U.S. PATENT DOCUMENTS 6,195,171 B1    2/2001  Ochiai
2004/0090652 A1* 5/2004  Yoon ....................... G06K 15/00
                                                           358/1.16
(Continued)

FOREIGN PATENT DOCUMENTS

JP    2-216521 A      8/1990
JP    8-314646 A     11/1996
(Continued)

OTHER PUBLICATIONS

International Search Report (PCT/ISA/210) issued in PCT Application No. PCT/JP2018/024082 dated Aug. 21, 2018 with English translation (five (5) pages).
(Continued)

*Primary Examiner* — Lam S Nguyen
(74) *Attorney, Agent, or Firm* — Crowell & Moring LLP

(57) ABSTRACT

An ink jet recording apparatus which is able to be operated by communication from a higher-level device includes a printing head that ejects ink, a communication unit which is able to perform communicating with the higher-level device, a program storage unit that stores a program, and a printing control unit that controls the printing head, and the program storage unit includes a communication program storage area in which a program corresponding to a predetermined communication protocol is stored in advance, and the program storage unit includes an extension area in which a program corresponding to a communication protocol different from the predetermined communication protocol is installable.

2 Claims, 4 Drawing Sheets

(56) References Cited

U.S. PATENT DOCUMENTS

2004/0156373 A1     8/2004   Ha et al.
2005/0141015 A1*   6/2005   Fusayuki ........... H04N 1/32561
                                                                              358/1.14

FOREIGN PATENT DOCUMENTS

| JP | 2000-322217 A | 11/2000 |
|----|---------------|---------|
| JP | 2003-80807 A  | 3/2003  |
| JP | 2004-126943 A | 4/2004  |
| JP | 2005-169631 A | 6/2005  |
| JP | 2007-8069 A   | 1/2007  |
| JP | 2007-143199 A | 6/2007  |
| JP | 2009-260839 A | 11/2009 |

OTHER PUBLICATIONS

Japanese-language Written Opinion (PCT/ISA/237) issued in PCT Application No. PCT/JP2018/024082 dated Aug. 21, 2018 (five (5) pages).

* cited by examiner

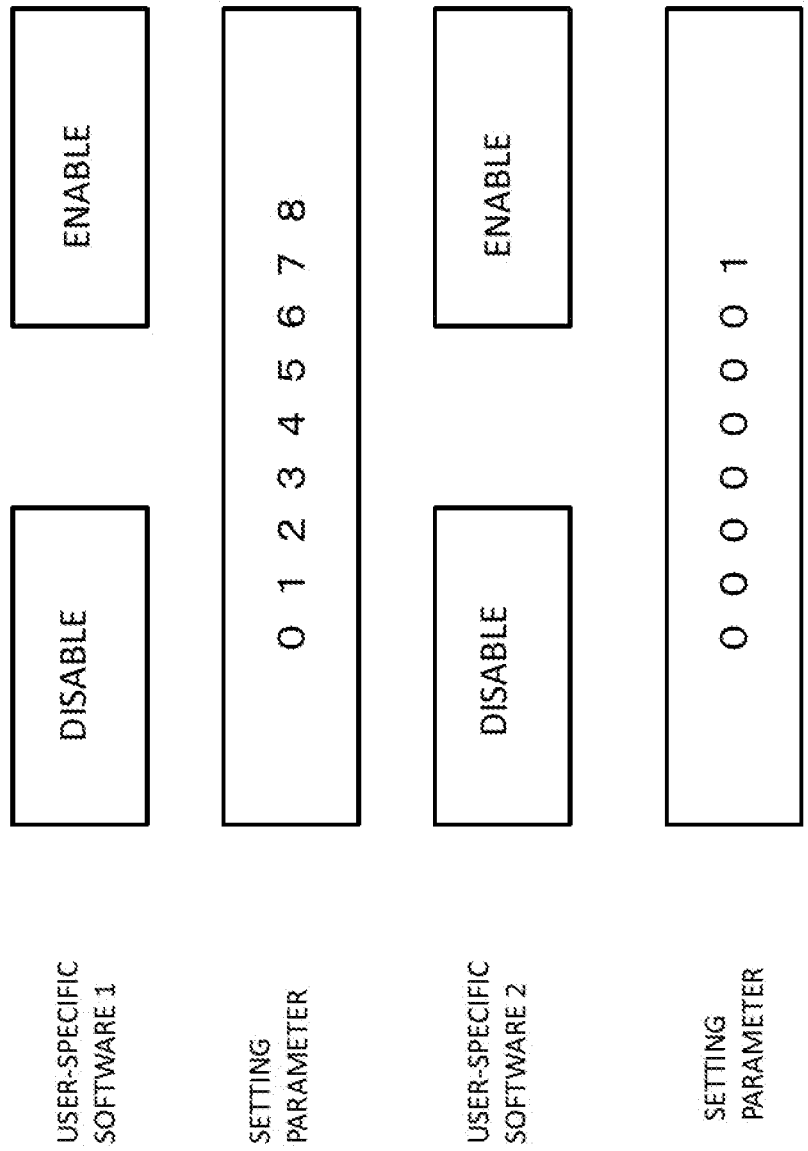

INK JET RECORDING APPARATUS

TECHNICAL FIELD

The present invention relates to an ink jet recording apparatus.

BACKGROUND ART

Patent Document 1 is disclosed as the background of the present invention. In this publication, "a communication protocol conversion device and method capable of enabling communication between devices having different communication protocols" is stated.

CITATION LIST

Patent Document

Patent Document 1: JP 2007-143199 A

SUMMARY OF THE INVENTION

Problems to be Solved by the Invention

The ink jet recording apparatus is used to print an expiration date, a manufacturing date, a serial number, or the like.

Therefore, it is often used especially in production lines in factories in which food, beverages, or the like are produced. In the production lines in the factories, conditions or settings content for performing printing are transmitted to an ink jet recording apparatus using communication from an external device by a higher-level device. The ink jet recording apparatus receives communication content, reflects the communication content as data, and executes printing.

However, communication schemes and communication protocols are diversified, and if a system is constructed by connecting devices with different communication protocols to each other, it is necessary to take a countermeasure. As a countermeasure, there are a method of switching a communication protocol used on a communication application of an ink jet recording apparatus, a method of changing a communication protocol used in a higher-level device, and a method of using a communication protocol converter. In the method of switching the communication protocol used on the communication application of the ink jet recording apparatus, the communication protocol used by software in the ink jet recording apparatus is not necessarily selectable. In the method of changing the communication protocol of the higher-level device, it is necessary to modify the higher-level device. Further, in the method of using the communication protocol converter, a cost for introducing the converter is incurred.

In the method disclosed in Patent Document 1, a method of enabling communication by converting to one matching communication protocol is provided, but the increase in cost, failure, and a problem handing risk as the number of devices to be physically connected increases is not considered.

In this regard, it is an object of the present invention to provide an ink jet recording apparatus that does not require a change in the higher-level device even if it is a communication protocol which is unable to be used by the ink jet recording apparatus.

Solutions to Problems

As an example of the present invention, an ink jet recording apparatus which is able to be operated by communication from a higher-level device includes a printing head that ejects ink, a communication unit which is able to perform communicating with the higher-level device, a program storage unit that stores a program, and a printing control unit that controls the printing head, and the program storage unit includes a communication program storage area in which a program corresponding to a predetermined communication protocol is stored in advance, and the program storage unit includes an extension area in which a program corresponding to a communication protocol different from the predetermined communication protocol is installable.

Effects of the Invention

According to the present invention, it is possible to realize an ink jet recording apparatus that does not require a change in the higher-level device.

BRIEF DESCRIPTION OF THE DRAWINGS

FIG. 4 is a diagram illustrating an ink jet recording apparatus with communication content conversion software installed therein.

MODE FOR CARRYING OUT THE INVENTION

Hereinafter, an embodiment of an ink jet recording apparatus according to the present invention will be described with reference to the appended drawings, but the present invention is not limited thereto.

First Embodiment

Figure 1:
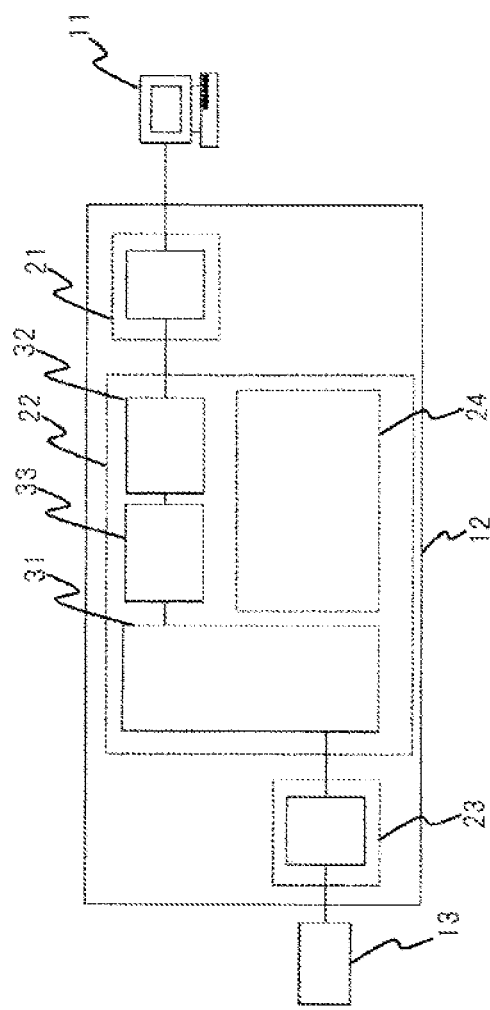
FIG. 1 is a schematic configuration diagram of an ink jet recording apparatus according to the present embodiment.

FIG. 1 is an example illustrating a schematic configuration of an ink jet recording apparatus according to the present embodiment.

11 indicates a higher-level device that communicates printing or operation content with the ink jet recording apparatus, 12 indicates the ink jet recording apparatus, and 13 indicates a printing head of the ink jet recording apparatus. 21 indicates a communication unit from the outside of the ink jet recording apparatus, 22 indicates a program area of the ink jet recording apparatus, and 23 indicates a printing control unit of the ink jet recording apparatus. 24 indicates a program area (extension area) of newly installable software, 31 indicates common function software of the ink jet recording apparatus in the program area, 32 indicates driver software that enables a communication port from the outside, and 33 indicates software of an external communication protocol (for example, Modbus TCP, EtherNet/IP, or the like).

As an example of operating the ink jet recording apparatus, there is an operation example of transmitting and operating printing settings via external communication from the higher-level device. In the case of the operation method as described in FIG. 1, printing and operation content are transmitted from the higher-level device 11 to the ink jet recording apparatus via external communication. The transmitted content is received by the communication unit 21 of the ink jet recording apparatus, processed by the driver software 32, and then the software 33 of the external communication protocol function operates and acquires the received content. Thereafter, the common function software 31 of the ink jet recording apparatus operates and executes a process for reflecting actual printing. The processed content is transmitted to the printing control unit 23, and ink is ejected from the printing head unit 13 at the printing timing, so that printing is executed. Several types of external communication protocol function software 33 are installed in the program area 22 of the ink jet recording apparatus in advance, and communication whose communication scheme matches with the higher-level device 11 becomes possible in according by selection and setting by the user side.

However, communication protocols and methods between devices are increasing in various ways, and there are cases in which users develop their own protocols, and there occurs a case in which it is unable to cope with only with an available communication schemes installed in advance.

Figure 2:
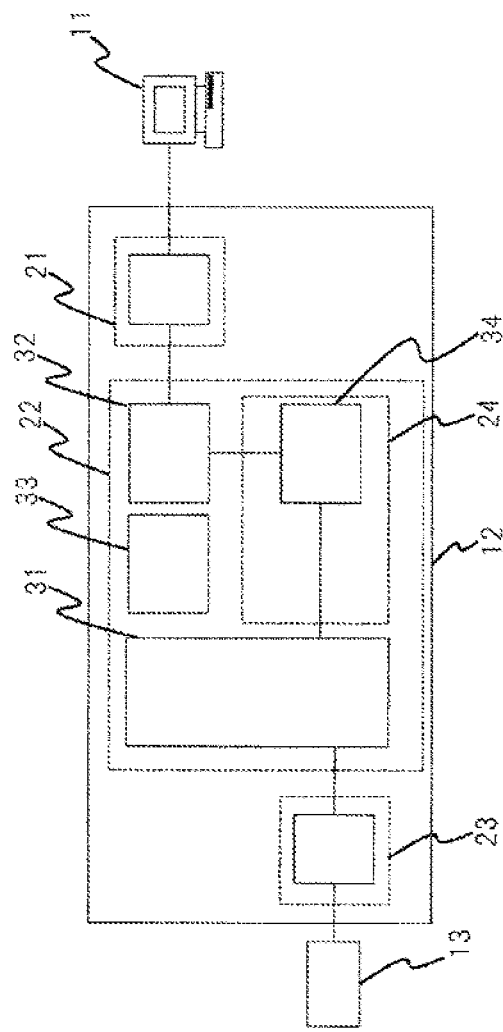
FIG. 2 is a diagram illustrating an ink jet recording apparatus with communication protocol conversion software installed therein.

In the present embodiment, an example in which, in a case in which the user uses a scheme other than a communication scheme installed in the ink jet recording apparatus in advance, external communication protocol function program of a communication scheme used by each user is installed in the program area (extension area) of the newly installable software, and printing is implemented by an ink jet recording apparatus system using external communication without changing the higher-level device of the user will be described. In FIG. 2, a case in which an external communication protocol function of a communication scheme other than a communication scheme installed in advance is used will be described. In a case in which a new external communication protocol function is implemented, it is necessary for the user to create software that operates together with a sharing function of the ink jet recording apparatus. A software specification for creating software is published by a developer of the ink jet recording apparatus and the software is created on the basis of the software specification.

The ink jet recording apparatus of the present embodiment includes a software program area 24 in which software created in advance by the user can be installed. The software created by the user is independent of a file of software which is used for update or recovery of the ink jet recording apparatus. The software of the ink jet recording apparatus recognizes the file of the software created by the user via an external storage or network, and the software can be installed in the program area 24. Since the program area 24 is completely independent of a program of the main body software 31 of the ink jet recording apparatus, the main body software is not erased even when the software created by the user is installed. Accordingly, it is possible to cause the main body software of the ink jet recording apparatus to coexist with the software created by the user on the same apparatus.

Second Embodiment

In the present second embodiment, an example in which the software created by the user is executed by the ink jet recording apparatus in addition to the above-described first embodiment will be described.

After the software is created, the software can be executed as the software is installed in the program area 24 of the newly installable software. The installed program includes an interface unit defined as the main body software of the ink jet recording apparatus, and executes transfer of information generated via a shared memory or the like. The main body software of the ink jet recording apparatus executes the software installed by the user if necessary while performing ink jet main control by the operating system or the like. The software installed by the user switches the communication scheme to be used in accordance with to the generated specifications. The external communication of the communication scheme to be used by the higher-level device 11 is transmitted in accordance with the generated specifications and received by the communication receiving unit 21 of the ink jet recording apparatus, and a program 34 installed in the program area 24 of the newly installable software as described above is executed. A reception process matching the external communication on the higher-level device side is executed by the program 34, and a process of reflecting at the time of stamping is executed by the common function software 31 of the ink jet recording apparatus. The processed content is transmitted to the printing control unit 23, and ink is ejected from the printing head unit 13 at the timing of printing, so that printing is executed. With the above-described flow, the ink jet recording apparatus executes the external communication reception process of the new communication scheme without changing the higher-level device and implements printing.

Third Embodiment

There are many cases in which industrial equipment is used to change setting content or execute an operation in the higher-level device. Similarly, even in the usage environment of the ink jet recording apparatus, there are many usages of executing control of changing a setting value or perform an operation through the higher-level device. However, there is a wide variety of communication schemes between the higher-level device and the ink jet recording apparatus, and the communication schemes are unable to be used unless the ink jet recording apparatus supports the communication protocol. Further, since each manufacturer that manufactures the ink jet recording apparatus may use its own communication format, in a current situation, it is difficult for the users to use other companies' ink jet recording apparatuses without changing the higher-level device. In a case in which the user changes to other companies' ink jet recording apparatuses, it is necessary to change the higher-level device, and there is a problem in that the initial cost increases at the time of introduction.

In a third embodiment, an example in which, in addition to the second embodiment, software that performs conversion so that communication schemes or communication formats for other companies' ink jet recording apparatuses or higher-level devices which are not supported by the ink jet recording apparatus can be supported is installed in the program area of the newly installable software of the ink jet recording apparatus, and thus the system using the ink jet recording apparatus without changing the higher-level device is implemented will be described.

Figure 3:
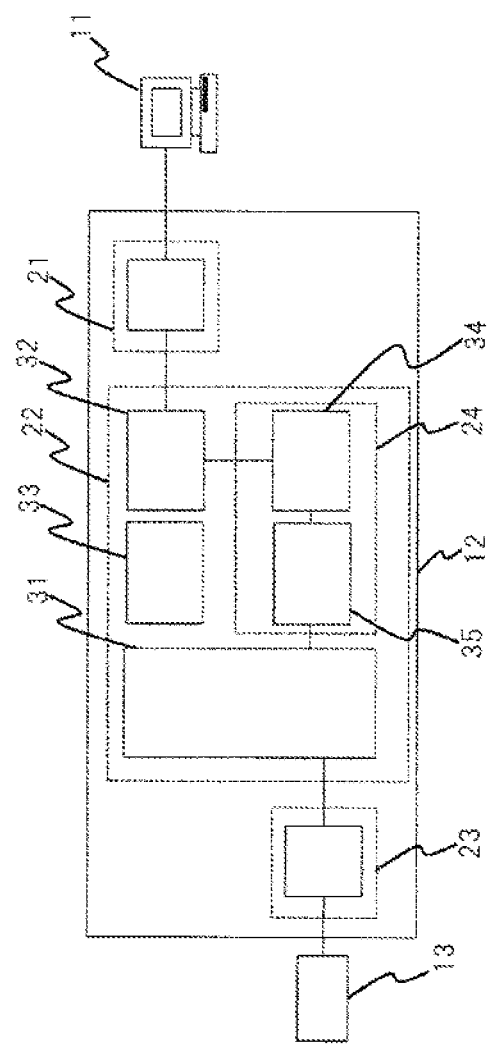
FIG. 3 is a diagram illustrating an ink jet recording apparatus with communication content conversion software installed therein.

FIG. 3 is an example illustrating a schematic configuration of an ink jet recording apparatus according to the present embodiment. In the second embodiment, in a case in which the communication format from the higher-level device of the ink jet recording apparatus is not supported, it can be coped with by installing the reception process of the target communication format, but when the ink jet recording apparatus receives a character size, a bar code, or the like of a printing format which is a setting item which is not supported, it is necessary to change the higher-level device. Therefore, in the present third embodiment, an example in which even when the ink jet recording apparatus receives an unsupported printing format or setting, printing condition of the setting item intended by the user is set, so that printing can be executed will be described. In a case in which the ink jet recording apparatus receives communication of the communication format supported in the second embodiment, an analysis process of received content is executed, the setting item in the ink jet recording apparatus is changed in accordance with the content and reflected in the process of the actual printing operation.

When the setting item is received, the content is analyzed, and the data is reflected in the printing control unit of the ink jet recording apparatus, but at that time, in the case of the setting content which is unable to be reflected by the ink jet recording apparatus, an error occurs. For example, in a certain model of an ink jet recording apparatus whose setting content can be changed by communication from an external device, when only a character size in which one character has 12 horizontal dots and 16 vertical dots and a character size in which one character has 18 horizontal dots and 24 vertical dots are selectable, printing of other character sizes is unable to be performed. In the above-described ink jet recording apparatus, when the communication scheme that can be received is extended using the second embodiment, there is a case in which the content is unknown or the setting content is unable to be reflected as a result of analyzing the received content.

In this regard, in the ink jet recording apparatus of the third embodiment, in a case in which a setting which is unable to be reflected in the setting content by the ink jet recording apparatus by a program additionally installed by the user side is communicated, a process of converting the setting content to the setting content which can be reflected in the ink jet recording apparatus is added to the program in advance. The setting content conversion process creates an additionally installable program in accordance with to the system of the usage environment of the user. In a case in which communication for performing printing of a character size in which one character has 14 horizontal dots and 18 vertical dots is transmitted from the higher-level device to the ink jet recording apparatus in which only a character size in which one character has 12 horizontal dots and 16 vertical dots and a character size in which one character has 18 horizontal dots and 24 vertical dots are selectable, the character size is converted to a smaller character size in which one character has 12 horizontal dots and 16 vertical dots or a larger character size in which one character has 18 horizontal dots and 24 vertical dots through an algorithm for determining the conversion execution, so that communication reception and the process of reflecting in the actual printing are executed without incurring the error. The algorithm for determining the conversion execution can be modified in accordance with the usage conditions of the user. It is also possible to change settings of parameters related to an execution determination algorithm from the screen of the ink jet recording apparatus through an operation. Accordingly, it is possible to construct a system more suitable for the usage environment of the user.

Fourth Embodiment

In a fourth embodiment, an example in which, in addition to the third embodiment, software that converts the printing content intended by the user is installed in the program area of the newly installable software of the ink jet recording apparatus, and thus the system using the ink jet recording apparatus is implemented without changing the higher-level device will be described.

FIG. 3 is an example illustrating a schematic configuration of an ink jet recording apparatus according to the present embodiment. FIG. 4 is a diagram illustrating an example of user-specific software 1 and 2, and setting parameters in the ink jet recording apparatus.

In the third embodiment, the process of reflecting the setting content by communication which can be supported by the ink jet recording apparatus as the setting content of the ink jet recording apparatus without converting the content. In the present fourth embodiment, an example in which the setting content received from the external device by communication is converted into the setting content intended by the user and reflected in the actual printing will be described.

First, the conversion process of the format which the user desires to convert is added to the newly installable software in advance. For example, in a case in which printing of a QR code (a registered trademark) is executed, the setting content is transmitted by communication along with information such as a QR code of 21 horizontal dots and 21 vertical dots which is a predetermined fixed size or a QR code of 31 horizontal dots and 31 vertical dots. The ink jet recording apparatus receives the setting content and reflects the setting content so that the actual printing can be performed, but when the user changes a QR code of another size as a result of performing actual printing, it is necessary to change the higher-level device. The conversion process of the format which the user desires to convert is added to newly installable software 35 in advance, and thus the size of the QR code whose setting content is transmitted from the higher-level device by communication is converted and reflected in the setting content of the ink jet recording apparatus, and thus actual printing of the QR code with the size intended by the user can be performed. Further, the above process, that is, the setting content indicating the conversion process to be executed can be also changed on the screen of the ink jet recording apparatus through an operation. Further, the format itself can be converted in addition to the character size of printing. After receiving as the setting content of the QR code, it is also possible to convert it to a data matrix format and reflect it in actual printing.

Incidentally, the present invention is not limited to the above-described embodiments and includes various modifications. For example, the above-described embodiments are detailed description in order to facilitate understanding of the present invention, and the present invention is not necessarily limited to those having all the configurations described above. Further, it is also possible to replace some of components of a certain embodiment with components of another embodiment, and it is also possible to add a component of another embodiment to a component of a certain embodiment. Further, addition, deletion, or substitution of other components may be performed on some components of each embodiment.

Further, some or all of the components, the functions, the processing units, the processing means, or the like described above may be realized by hardware by designing them, for example, with an integrated circuit. Further, the components, the functions, or the like described above may be realized by software by interpreting and executing a program that realizes each function through a processor. Information such as a program, a table or a file that realizes each function can be stored in a memory, a recording device such as a hard disk or a solid state drive (SSD), or a recording medium such as an IC card, an SD card, or a DVD.

Further, control lines and information lines considered necessary for description are illustrated, but all control lines and all information lines in a product need not be necessarily illustrated. In practice, almost all the components may be considered to be connected to one another.

REFERENCE SIGNS LIST

11 Higher-level device
12 Ink jet recording apparatus
13 Printing head
21 External communication unit
22 Ink jet recording apparatus program area
23 Printing control unit
24 Program area of software newly expandable by user
31 Ink jet recording apparatus common function software
32 External communication driver
33 External communication protocol function software
34 Communication protocol conversion software installed by user
35 Communication content conversion software installed by user

The invention claimed is:

1. An ink jet recording apparatus which is able to be operated by communication from a higher-level device, comprising:
a printing head that ejects ink;
a communication unit which is able to perform communicating with the higher-level device;
a program storage unit that stores a program; and
a printing control unit that controls the printing head,
wherein the program storage unit includes a communication program storage area in which a program corresponding to a predetermined communication protocol is stored in advance, and
the program storage unit includes an extension area in which a program corresponding to a communication protocol different from the predetermined communication protocol is installable,
wherein the program installed in the extension area is a program having a function of converting, when a setting of a specification in which a setting is unable to be reflected in the ink jet recording apparatus is received from the higher-level device, the received setting to a format of a reflectable specification and reflecting a setting value in software of a main body side of the ink jet recording apparatus, and
the program installed in the extension area and the program stored in advance become mutually executable.

2. The ink jet recording apparatus according to claim 1, wherein the program installed in the extension area and the program stored in advance become mutually executable.

* * * * *